UNITED STATES PATENT OFFICE.

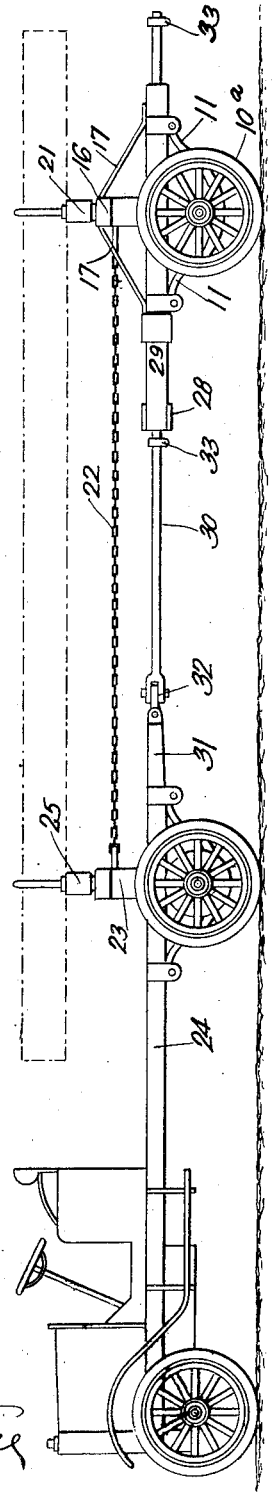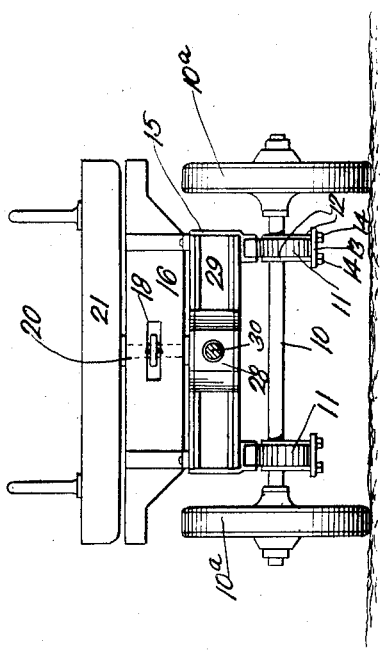

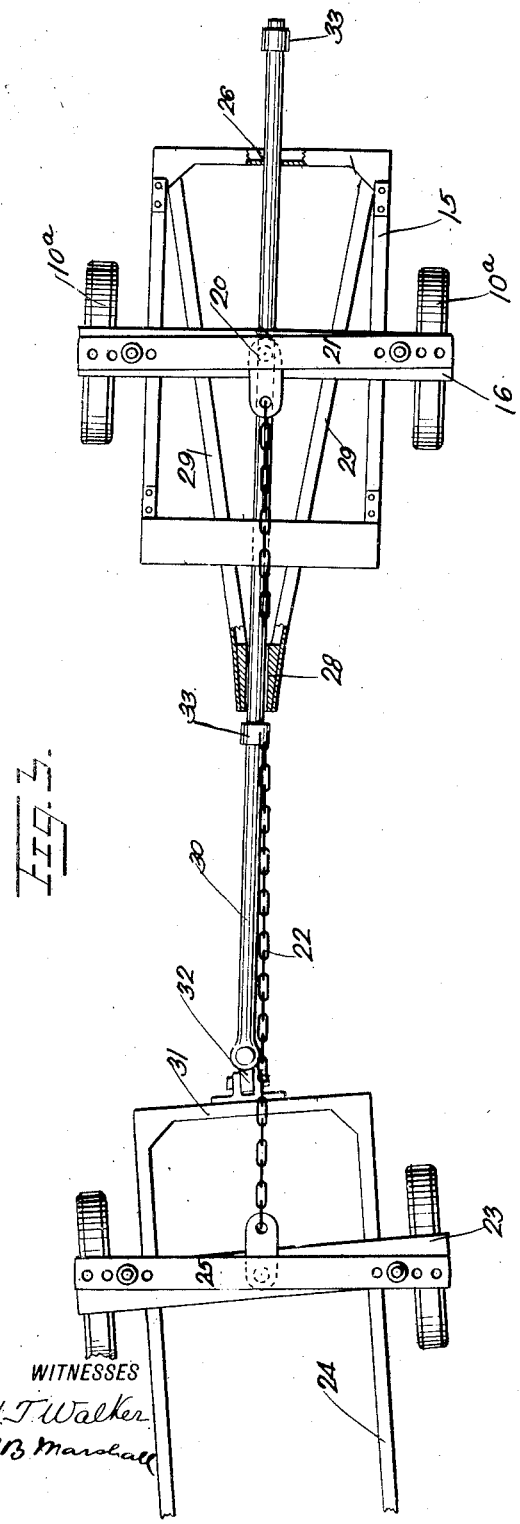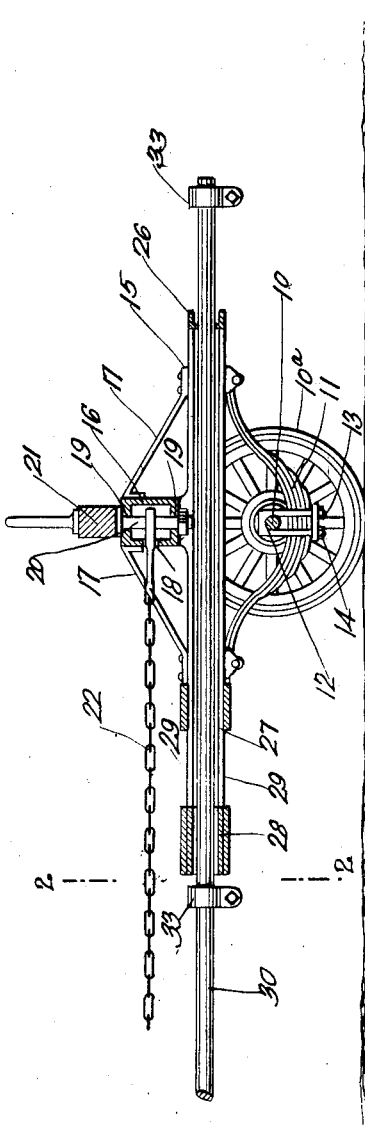

FREDERICK B. ALLEN, OF JOPLIN, MISSOURI, ASSIGNOR TO FORSYTHE MFG. CO., OF JOPLIN, MISSOURI, A PARTNERSHIP COMPOSED OF ALBERT H. FORSYTHE AND JESSE E. FORSYTHE.

TRAILER.

1,338,546.      Specification of Letters Patent.      Patented Apr. 27, 1920.

Application filed March 19, 1918. Serial No. 223,335.

*To all whom it may concern:*

Be it known that I, FREDERICK B. ALLEN, a citizen of the United States, and a resident of Joplin, in the county of Jasper and State of Missouri, have invented a new and Improved Trailer, of which the following is a full, clear, and exact description.

My invention has for its object to provide a trailer having a longitudinal bearing through which is disposed a guide pole adapted to be articulated to the rear of a truck; draft means being secured to the pivot of a bolster on the trailer and being adapted to be secured at the pivot of a bolster on the truck.

Additional objects of the invention will appear in the following specification in which the preferred form of my invention is described.

In the drawings, similar reference characters refer to similar parts in all the views, in which—

Figure 1 is a side elevation showing how my trailer is secured to a truck.

Fig. 2 is a sectional view on the line 2—2 of Fig. 4.

Fig. 3 is a plan view showing my trailer and the rear of a truck to which it is secured.

Fig. 4 is a sectional side elevation of the trailer.

The usual manner of attaching a trailer to a truck is by a tongue secured rigidly to the trailer and attached to the truck by a universal joint. With this construction, when the load is supported by bolsters on the trailer and on the truck, it is impossible to turn without something slipping. Either the load must slip or the wheels must slide. This difficulty has been overcome by the present invention, for the draft member is pivoted to the truck and to the trailer at the axes of the bolsters, thereby maintaining the distance between the bolster centers at all times and under all conditions, the trailer being steered by a guide pole journaled in a longitudinal bearing in the trailer and connected to the rear of the truck by a universal joint.

By referring to the drawings, it will be seen that the trailer has an axle 10, which is disposed transversely over springs 11, and is secured thereto by a U shaped member 12, the arms of which depend at the sides of the spring 11 and which extend through openings in plates 13; nuts 14 meshing with the threaded terminals of the arms and pressing against the plates 13 to secure together the axle and the springs. The axle 10 is supported on wheels 10ª.

The springs 11 are secured to the frame 15 which is preferably rectangular, this frame 15 having a transverse support 16 which is braced by members 17 and which has an opening 18 extending through the front of the transverse support 16 and which is provided with bearings 19 through which is disposed a pivot pin 20.

Supported on this pivot pin 20 there is a bolster 21 of the usual construction. A draft member 22, shown in the drawings as a chain, is disposed through the opening 18 in the transverse support 16 and is secured to the pivot pin 21. This draft member 22 is secured to a pin in a support 23 on the truck 24 in the same manner that it is secured to the support 16, and a bolster 25 is pivoted to the support 23 in the same manner that the bolster 21 is pivoted to the support 16.

With this construction it will be seen that the centers of the bolsters 21 and 25 will always be spaced apart at a predetermined distance, so that with the movement of the truck with the trailer, whether or not in a straight path, the load will be carried on the bolsters 21 and 25, and as these bolsters are permitted to rotate on their axis, the load will be carried without any possibility of slipping.

As best shown in Fig. 4 of the drawings, there is an opening 26 through the rear of the frame 15 and an opening 27 through the front of the frame. There is also a bearing 28 which is spaced from the front of the frame and is supported by members 29 which are secured to the frame and which converge forwardly. In the bearing 28 and in the openings 27 and 26, there is disposed a guide pole 30 which is secured to the rear part 31 of the truck 24 by means of a universal joint 32. This guide pole 30 serves to steer the trailer which is moved forwardly by the draft member 22, the guide pole 30 moving longitudinally through the bearing 28 and the openings 27 and 26, as may be necessary when turning corners. Collars 33 are preferably secured to the guide pole 30, one at the front of the bearing 28 and the other at the rear of the frame 15, to limit the longitudinal movement of the guide pole.

What I claim as new and desire to secure by Letters Patent is:

1. In combination with a truck member having a pivoted bolster, a detachable trailer member having a pivoted bolster, a draft member, a longitudinal bearing in one of the first two mentioned members, a guide pole disposed in the bearing, and a universal joint connecting the guide pole with the other of the first two mentioned members, the draft member being pivoted on the truck member and on the trailer member at their pivots and also relatively to the bolsters to prevent the shifting of the load carried by the bolsters if the power on the truck member should be suddenly increased.

2. A two-wheeled trailer having a pivoted bolster and a longitudinal bearing, a guide pole movable longitudinally in the bearing, and a draft member mounted on the trailer at its pivot and free to rotate a limited distance relatively to the bolster and the body of the two-wheeled trailer.

3. In combination with a truck member having a vertically extending pin and a bolster pivoted thereon, a trailer member having a vertical pin and a bolster pivoted thereon, a flexible draft member having terminals mounted on the pins and relatively to the bolster, a longitudinal bearing in one of the first two mentioned members, and a guide pole articulated to the other of the first two mentioned members and disposed in the bearing.

4. A trailer having a frame with a transverse support and provided with a longitudinally extending bearing, there being an opening through the front of the support and bearings at the top and bottom of the support, a pin in the bearings and extending above the support, a bolster mounted on the pin and disposed above the support, a draft member disposed through the opening at the front of the support and having an end encircling the pin, and a guide pole movable longitudinally in the bearing and free to move on a vertical axis relatively to the bolsters.

5. In a trailer, a frame having a transverse support with an opening through the front of the support, bearings at the top and bottom of the support, a pin in the bearings extending above the support, a bolster mounted on the pin, and a draft member disposed through the front of the opening in the support and fulcrumed to the pin and free to move on a vertical axis relatively to the bolster.

6. In combination with a truck member having a pivoted bolster, a detachable trailer member having a pivoted bolster, a draft member having terminals pivoted on the trailer member and the truck member, a longitudinal bearing in one of the first two mentioned members, a guide pole articulated to the other of the first two mentioned members and disposed in the bearing, and collars secured to the guide pole beyond the longitudinal bearing to limit the longitudinal movement of the guide pole relatively to the bearing member.

7. A trailer having a frame with a transverse support and provided with a longitudinally extending bearing disposed below the support, there being an opening through the front of the support and bearings at the top and bottom of the support, a pin in the bearings and extending above the support, a bolster disposed above the support and pivoted on the pin, a draft member disposed through the opening at the front of the support and having a terminal pivoted on the pin, and a guide pole movable longitudinally in the bearing.

8. In combination with a truck member having a pivoted bolster, a detachable trailer member having a pivoted bolster, a flexible draft member, a longitudinal bearing in one of the first two mentioned members, a guide pole disposed in the bearing, and a universal joint connecting the guide pole with the other of the first two mentioned members, the flexible draft member being mounted on the truck member and on the trailer member at their pivots and also relatively to the bolsters to prevent the shifting of the load carried by the bolsters if the power on the truck member should be suddenly increased.

FREDERICK B. ALLEN.